United States Patent
Fu et al.

(10) Patent No.: US 10,846,393 B2
(45) Date of Patent: Nov. 24, 2020

(54) APPLICATION PROGRAM INTEGRITY VERIFICATION METHOD AND NETWORK DEVICE

(71) Applicant: Huawei Technologies Co., Ltd., Shenzhen (CN)

(72) Inventors: Tianfu Fu, Shenzhen (CN); Chong Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 80 days.

(21) Appl. No.: 15/594,264

(22) Filed: May 12, 2017

(65) Prior Publication Data

US 2017/0249456 A1    Aug. 31, 2017

Related U.S. Application Data

(63) Continuation of application No. PCT/CN2015/086262, filed on Aug. 6, 2015.

(30) Foreign Application Priority Data

Nov. 14, 2014    (CN) .......................... 2014 1 0647567

(51) Int. Cl.
    *G06F 21/54*    (2013.01)
    *G06F 21/56*    (2013.01)
    (Continued)

(52) U.S. Cl.
    CPC .......... *G06F 21/51* (2013.01); *G06F 12/1408* (2013.01); *G06F 21/56* (2013.01);
    (Continued)

(58) Field of Classification Search
    CPC ..................... G06F 2212/1052; G06F 12/1408
    See application file for complete search history.

(56) References Cited

U.S. PATENT DOCUMENTS 5,944,821 A    8/1999 Angelo
6,106,396 A    8/2000 Alcorn et al.
(Continued)

FOREIGN PATENT DOCUMENTS

CN    101251883 A    8/2008
CN    101877639 A    11/2010
(Continued)

OTHER PUBLICATIONS

Van Oorschot, Paul C., and Glenn Wurster. "Reducing unauthorized modification of digital objects." IEEE Transactions on Software Engineering 38.1 (2011): 191-204. (Year: 2011).*

*Primary Examiner* — Madhuri R Herzog
(74) *Attorney, Agent, or Firm* — Leydig, Voit & Mayer, Ltd.

(57) ABSTRACT

Embodiments of the present disclosure disclose an application program integrity verification method and a network device. The method includes: performing eigenvalue calculation on data of an application program when the application program starts, to obtain a first digest of the application program (101); decrypting a stored digital signature of the application program according to a public key in an embedded key pair to obtain a second digest of the application program, where the digital signature is obtained, according to a private key in the key pair, by signing data of the application program each time the application program is updated (102), and the key pair is a manufacturer key pair corresponding to the application program; and determining that integrity verification of the application program passes if the first digest and the second digest are the same, otherwise, determining that integrity verification of the application program does not pass (103).

12 Claims, 4 Drawing Sheets

(51) Int. Cl.
*G06F 21/57* (2013.01)
*G06F 12/14* (2006.01)
*H04L 9/32* (2006.01)
*H04L 29/06* (2006.01)
*G06F 21/51* (2013.01)

(52) U.S. Cl.
CPC ............ *G06F 21/565* (2013.01); *G06F 21/57* (2013.01); *H04L 9/3234* (2013.01); *H04L 9/3247* (2013.01); *H04L 63/0435* (2013.01); *H04L 63/0442* (2013.01); *H04L 63/061* (2013.01); *H04L 63/123* (2013.01); *G06F 2212/1052* (2013.01)

(56) References Cited

U.S. PATENT DOCUMENTS

| | | | |
|---|---|---|---|
| 6,510,521 B1 * | 1/2003 | Albrecht | G06F 12/1466 711/E12.094 |
| 6,694,434 B1 * | 2/2004 | McGee | G06F 21/565 713/182 |
| 7,043,641 B1 * | 5/2006 | Martinek | G06F 21/123 380/251 |
| 7,093,132 B2 | 8/2006 | Aho et al. | |
| 8,788,841 B2 | 7/2014 | Aciicmez et al. | |
| 2003/0014639 A1 * | 1/2003 | Jackson | G06F 21/64 713/181 |
| 2005/0027987 A1 * | 2/2005 | Neufeld | G06F 21/31 713/176 |
| 2007/0219922 A1 | 9/2007 | Shin et al. | |
| 2008/0282093 A1 * | 11/2008 | Hatakeyama | G06F 12/1416 713/190 |
| 2010/0281264 A1 | 11/2010 | Sakumoto | |
| 2014/0033193 A1 * | 1/2014 | Palaniappan | G06F 21/57 717/173 |
| 2014/0279985 A1 | 9/2014 | Fontenot et al. | |

FOREIGN PATENT DOCUMENTS

| | | |
|---|---|---|
| CN | 103577748 A | 2/2014 |
| CN | 103731395 A | 4/2014 |
| CN | 103810421 A | 5/2014 |
| CN | 104462965 A | 3/2015 |
| EP | 3196797 A1 | 7/2017 |

* cited by examiner

APPLICATION PROGRAM INTEGRITY VERIFICATION METHOD AND NETWORK DEVICE

CROSS-REFERENCE TO RELATED APPLICATIONS

This application is a continuation of International Application No. PCT/CN2015/086262, filed on Aug. 6, 2015, which claims priority to Chinese Patent Application No. 201410647567.8, filed on Nov. 14, 2014. The disclosures of the aforementioned applications are hereby incorporated by reference in their entireties.

TECHNICAL FIELD

The present disclosure relates to an application program integrity verification method and a network device.

BACKGROUND

With rapid development of the internet, people perform network operations such as online transfer and online shopping through the internet more frequently. Meanwhile, some villains tamper with an application program in a network device to steal user private information such as an account number and a password, which poses a threat to property safety of a user. Therefore, a verification on integrity for an application program is urgently required, to determine whether the application program is tampered with.

At present, to further ensure integrity of an application program and prevent a villain from tampering with an application program, a security central processing unit (CPU) and a trusted platform module (TPM) chip may be disposed in a network device. In this way, when a manufacturer publishes an application program, hash calculation is performed on data of the application program to obtain a first hash digest of the application program, information about the first hash digest is signed by using a manufacturer private key, to obtain a digital signature of the application program, the digital signature of the application program and the data of the application program are packed as a program package, and then the program package is published. When downloading the program package of the application program, the network device stores the digital signature in the program package to the TPM chip. Subsequently, when the network device starts the application program, the security CPU in the network device performs hash calculation on the data of the application program to obtain a second hash digest of the application program, obtains the digital signature of the application program from the TPM chip of the network device, and decrypts the obtained digital signature by using an embedded manufacturer public key, to obtain the first hash digest of the application program. The first hash digest is compared with the second hash digest. If the two are the same, it is determined that the application program is not tampered with, and integrity verification of the application program passes; otherwise, it is determined that the application program is tampered with, and integrity verification of the application program does not pass.

When a vulnerability exists in the application program of the network device, patching needs to be performed on the application program. Patches are generally distributed on multiple data fragments of the application program, and the stored digital signature in the TPM chip of the network device is obtained by means of signing when the application program is published, that is, the stored digital signature in the TPM chip is obtained based on original data of the application program. Therefore, data obtained after patching is performed on the application program is different from the original data, and integrity verification cannot be performed, based on the digital signature of the original data, on the application program obtained after patching is performed.

SUMMARY

To resolve a prior-art problem, embodiments of the present disclosure provide an application program integrity verification method and a network device.

Technical solutions are as follows.

According to a first aspect, an application program integrity verification method is provided, where the method includes:

performing eigenvalue calculation on data of an application program when the application program starts, to obtain a first digest of the application program;

decrypting a stored digital signature of the application program according to a public key in an embedded key pair to obtain a second digest of the application program, where the digital signature is obtained, according to a private key in the key pair, by signing data of the application program each time the application program is updated, and the key pair is a manufacturer key pair corresponding to the application program; and determining that integrity verification of the application program passes if the first digest and the second digest are the same, or determining that integrity verification of the application program does not pass if the first digest and the second digest are different.

With reference to the first aspect, in a first possible implementation manner of the first aspect, before the performing eigenvalue calculation on data of an application program when the application program starts, to obtain a first digest of the application program, the method further includes:

performing eigenvalue calculation on the data of the application program when receiving an update completion instruction, to obtain the second digest of the application program;

signing the second digest according to the private key to obtain the digital signature of the application program; and storing the digital signature of the application program.

With reference to the first aspect or the first possible implementation manner of the first aspect, in a second possible implementation manner of the first aspect, the performing eigenvalue calculation on the data of the application program to obtain the second digest of the application program includes:

reading the data of the application program in a memory into a static random access memory SRAM inside a security central processing unit CPU;

reading the data in the SRAM by using a security engine inside the security CPU; and performing eigenvalue calculation on the read data by using the security engine, to obtain the second digest of the application program.

With reference to the first possible implementation manner of the first aspect or the second possible implementation manner of the first aspect, in a third possible implementation manner of the first aspect, the storing the digital signature of the application program includes:

storing the digital signature of the application program to a trusted non-volatile random access memory NVRAM inside the security CPU.

With reference to any one of the first to the third possible implementation manners of the first aspect, in a fourth possible implementation manner of the first aspect, before the decrypting a stored digital signature of the application program according to a public key in an embedded key pair to obtain the second digest of the application program, the method further includes:

obtaining the stored digital signature in the trusted NVRAM by using the security engine inside the security CPU.

According to a second aspect, a network device is provided, and the network device includes:

a first calculation module, configured to perform eigenvalue calculation on data of an application program when the application program starts, to obtain a first digest of the application program;

a decryption module, configured to decrypt a stored digital signature of the application program according to a public key in an embedded key pair to obtain a second digest of the application program, where the digital signature is obtained, according to a private key in the key pair, by signing data of the application program each time the application program is updated, and the key pair is a manufacturer key pair corresponding to the application program; and a determining module, configured to determine that integrity verification of the application program passes if the first digest and the second digest are the same, or determine that integrity verification of the application program does not pass if the first digest and the second digest are different.

With reference to the second aspect, in a first possible implementation manner of the second aspect, the network device further includes:

a second calculation module, configured to perform eigenvalue calculation on the data of the application program when receiving an update completion instruction, to obtain the second digest of the application program;

a signature module, configured to sign the second digest according to the private key to obtain the digital signature of the application program; and a storage module, configured to store the digital signature of the application program.

With reference to the first possible implementation manner of the second aspect, in a second possible implementation manner of the second aspect, the second calculation module includes:

a read-in unit, configured to read the data of the application program in a memory into a static random access memory SRAM inside a security central processing unit CPU;

a reading unit, configured to read the data in the SRAM by using a security engine inside the security CPU; and a calculation unit, configured to perform eigenvalue calculation on the read data by using the security engine, to obtain the second digest of the application program.

With reference to the first possible implementation manner of the second aspect or the second possible implementation manner of the second aspect, in a third possible implementation manner of the second aspect, the storage module includes:

a storage unit, configured to store the digital signature of the application program to a trusted non-volatile random access memory NVRAM inside the security CPU.

With reference to the first possible implementation manner of the second aspect or the second possible implementation manner of the second aspect or the third possible implementation manner of the second aspect, in a fourth possible implementation manner of the second aspect, the network device further includes:

an obtaining module, configured to obtain the stored digital signature in the trusted NVRAM by using the security engine inside the security CPU.

In the embodiments of the present disclosure, each time an application program in a network device is updated, data of the application program is updated. In this case, the network device signs data of the application program according to a private key in an embedded key pair to obtain a digital signature of the application program. Eigenvalue calculation is performed on data of the application program when the application program starts, to obtain a first digest of the application program, and the digital signature of the application program is decrypted according to a public key in the key pair to obtain a second digest of the application program. It is determined that integrity verification of the application program passes if the first digest and the second digest are the same, or it is determined that integrity verification of the application program does not pass if the first digest and the second digest are different. The manufacturer key pair is embedded in the network device, and the data of the application program is signed according to the private key in the key pair each time the network device updates the application program, so that the digital signature of the application program is updated, and consequently, the second digest is also updated, which ensures that integrity verification of the application program can be performed after the application program is updated.

BRIEF DESCRIPTION OF DRAWINGS

To illustrate technical solutions of embodiments of the present disclosure more clearly, the following briefly describes the accompanying drawings required in description of the embodiments. Apparently, the accompanying drawings described below are merely some of the embodiments of the present disclosure, and a person of ordinary skill in the art may still derive other drawings according to these accompanying drawings without creative efforts.

DESCRIPTION OF EMBODIMENTS

To make objectives, technical solutions, and advantages of the present disclosure clearer, the following further details implementation manners of the present disclosure with reference to the accompanying drawings.

Before the present disclosure is explained in detail, an application scenario of embodiments of the present disclosure is first described. A villain may tamper with an application program in a network device to steal user private information such as an account number and a password, which poses a threat to property safety of a user. Therefore, each time the application program starts, the network device needs to perform integrity verification on the application program, so as to determine whether the application program is tampered with. However, as time goes by, a vulnerability may exist in the application program of the network device. In this case, patching needs to be performed on the application program in the network device. Patches are generally distributed on multiple data fragments of the application program; consequently, integrity verification cannot be performed, according to a method for separately performing integrity verification on the application program and on the patches, on the application program obtained after patching is performed. In addition, a stored digital signature in a trusted platform module (TPM) chip of the network device is obtained based on original data of the application program, and data of the application program obtained after patching is performed is different from the original data. Therefore, integrity verification cannot be performed, based on the digital signature of the original data, on the application program obtained after patching is performed. In this case, the embodiments of the present disclosure provide a method for application program integrity verification, in which the network device may still perform integrity verification on the application program after patching is performed on the application program.

Figure 1:
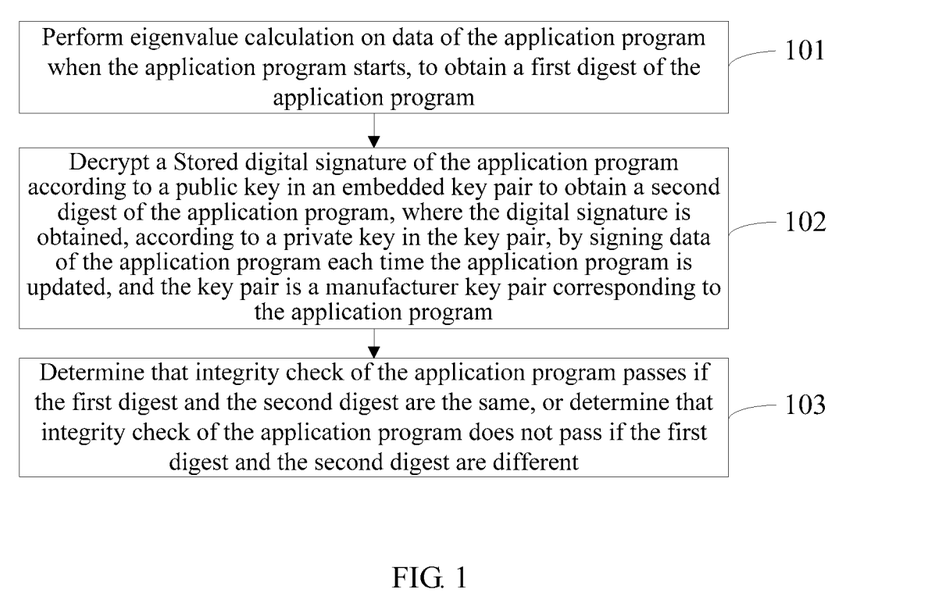
FIG. 1 is a flowchart of an application program integrity verification method according to an embodiment of the present disclosure.

FIG. 1 is a flowchart of an application program integrity verification method according to an embodiment of the present disclosure. The method is executed by a network device, and a manufacturer key pair corresponding to an application program is stored in a trusted location of the network device. Referring to FIG. 1, the method includes the following steps.

S101: Perform eigenvalue calculation on data of the application program when the application program starts, to obtain a first digest of the application program.

In the embodiment of the present disclosure, the eigenvalue calculation may be hash calculation. Certainly, the eigenvalue calculation may alternatively be another calculation method, which is not specifically limited in the embodiment of the present disclosure. In addition, when the eigenvalue calculation is the hash calculation, an algorithm of the hash calculation may be a secure hash algorithm (SHA), an SHA2 algorithm, an SM3 cryptographic hash algorithm of Chinese commercial cryptographic hash algorithm standard published by State Cryptography Administration, or the like, which is not specifically limited in the embodiment of the present disclosure.

S102: Decrypt a stored digital signature of the application program according to a public key in an embedded key pair to obtain a second digest of the application program, where the digital signature is obtained, according to a private key in the key pair, by signing data of the application program each time the application program is updated, and the key pair is the manufacturer key pair corresponding to the application program.

S103: Determine that integrity verification of the application program passes if the first digest and the second digest are the same, or determine that integrity verification of the application program does not pass if the first digest and the second digest are different.

In the embodiment of the present disclosure, each time an application program in a network device is updated, data of the application program is updated. In this case, the network device signs data of the application program according to a private key in an embedded key pair to obtain a digital signature of the application program. Eigenvalue calculation is performed on data of the application program when the application program starts, to obtain a first digest of the application program, and the digital signature of the application program is decrypted according to a public key in the key pair to obtain a second digest of the application program. It is determined that integrity verification of the application program passes if the first digest and the second digest are the same, or it is determined that integrity verification of the application program does not pass if the first digest and the second digest are different. The manufacturer key pair is embedded in the network device, and the data of the application program is signed according to the private key in the key pair each time the network device updates the application program, so that the digital signature of the application program is updated, and consequently, the second digest is also updated, which ensures that integrity verification of the application program can be performed after the application program is updated.

Optionally, before the performing eigenvalue calculation on data of the application program when the application program starts, to obtain a first digest of the application program, the method further includes:

performing eigenvalue calculation on the data of the application program when receiving an update completion instruction, to obtain the second digest of the application program;

signing the second digest according to the private key in the key pair to obtain the digital signature of the application program; and storing the digital signature of the application program.

Optionally, the performing eigenvalue calculation on the data of the application program to obtain the second digest of the application program includes:

reading the data of the application program in a memory into a static random access memory (SRAM) inside a security CPU;

reading the data in the SRAM by using a security engine inside the security CPU; and performing eigenvalue calculation on the read data by using the security engine, to obtain the second digest of the application program.

Optionally, the storing the digital signature of the application program includes:

storing the digital signature of the application program to a trusted non-volatile random access memory (NVRAM) inside the security CPU.

Optionally, before the decrypting a stored digital signature of the application program according to a public key in an embedded key pair to obtain a second digest of the application program, the method further includes:

obtaining the stored digital signature in the trusted NVRAM by using the security engine inside the security CPU.

All foregoing optional technical solutions may form an optional embodiment of the present disclosure in any combination, and details are not described in the embodiment of the present disclosure again.

Figure 2:
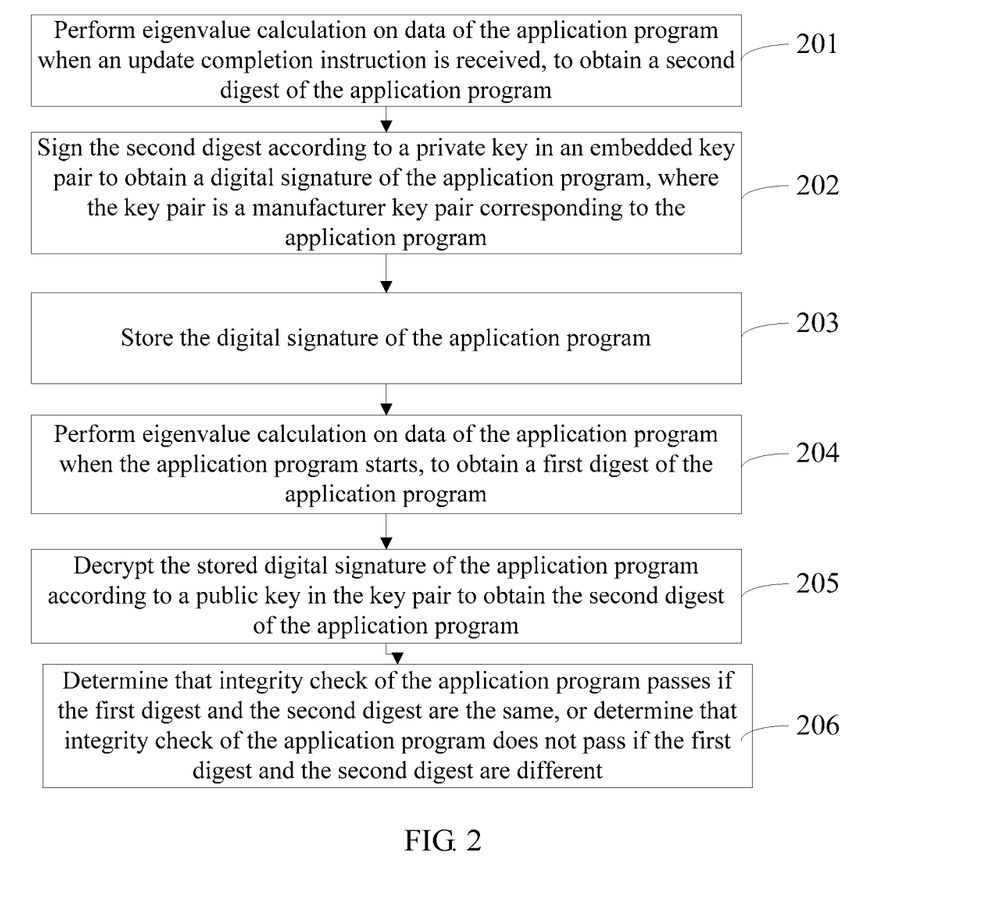
FIG. 2 is a flowchart of an application program integrity verification method according to an embodiment of the present disclosure.

FIG. 2 is a flowchart of an application program integrity verification method according to an embodiment of the present disclosure. The method may be executed by a network device, and a manufacturer key pair corresponding to an application program is stored in a trusted location of the network device. Referring to FIG. 2, the method includes the following steps.

S201: Perform eigenvalue calculation on data of the application program when an update completion instruction is received, to obtain a second digest of the application program.

Because a vulnerability may exist in the application program of the network device, the network device needs to perform patching on the application program, or a manufacturer upgrades the application program, and the network device needs to upgrade the application program. When completing patching or upgrading of the application program, the network device receives an update completion instruction. The update completion instruction may be obtained by means of triggering by the network device, or may be obtained by means of triggering by the network device when the network device receives a completion response from a server, where the server is a device storing the application program. After updating the application program in the network device, the data of the application program in the network device change. In this case, the second digest of the application program needs to be recalculated, and then the application program is re-signed.

Figure 3:
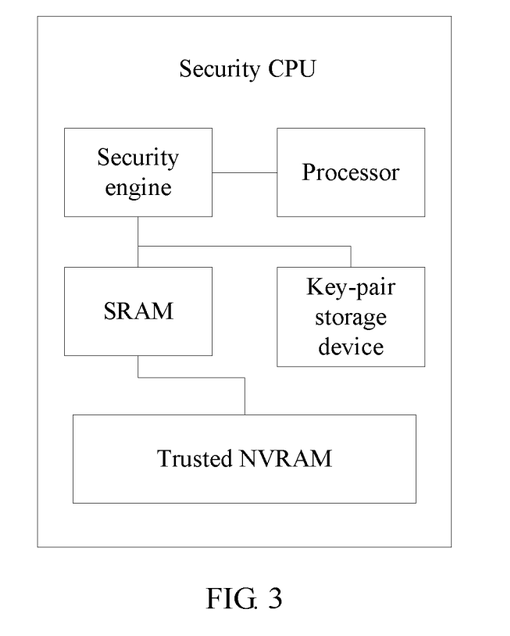
FIG. 3 is a schematic diagram of an internal structure of a security CPU according to an embodiment of the present disclosure.

In addition, to further ensure integrity of the application program and prevent a villain from tampering with the application program, a security CPU may be disposed in the network device. A diagram of an internal structure of the security CPU is shown in FIG. 3. The security CPU includes a security engine, a processor, an SRAM, a key-pair storage device, and a trusted NVRAM, where the security engine, the SRAM, the key-pair storage device, and the trusted NVRAM are all secure and trusted. The security engine is configured to: read data in the SRAM and process the read data; the SRAM is configured to store data of a trusted application program; the key-pair storage device is configured to store a manufacturer key pair; the trusted NVRAM is configured to store a digital signature of the application program. Therefore, an operation of performing eigenvalue calculation on the data of the application program to obtain the second digest of the application program may specifically be: reading the data of the application program in a memory into the static random access memory SRAM inside the security central processing unit CPU by the security CPU; reading the data in the SRAM by using the security engine inside the security CPU; and performing eigenvalue calculation on the read data by using the security engine, to obtain the second digest of the application program.

The security engine may read the data from the SRAM, but the processor cannot read the data from the SRAM, which ensures that the data in the SRAM is not infected, so as to ensure credibility and reliability of the data. In addition, the eigenvalue calculation may be hash calculation. Certainly, the eigenvalue calculation may alternatively be another calculation method, which is not specifically limited in the embodiment of the present disclosure. Moreover, when the eigenvalue calculation is the hash calculation, an algorithm of the hash calculation may be a secure hash algorithm (SHA), an SHA2 algorithm, an SM3 cryptographic hash algorithm of Chinese commercial cryptographic hash algorithm standard published by State Cryptography Administration, or the like, which is not specifically limited in the embodiment of the present disclosure.

It should be noted that, the application program involved in the embodiment of the present disclosure may be an operating system, where the operating system may further have an application APP installed. Certainly, the application program may alternatively be a third party application program, which is not specifically limited in the embodiment of the present disclosure. In addition, the network device involved in the embodiment of the present disclosure may be a network device such as a router, and an operating system of the network device may be an embedded operating system. Certainly, for a device on which a common operating system is installed, application program integrity verification may be performed based on a method same as or similar to the embodiment of the present disclosure. For example, the device on which the common operating system is installed may be a computer, a mobile phone, a palmtop computer, or the like, which is also not specifically limited in the embodiment of the present disclosure.

S202: Sign the second digest according to a private key in an embedded key pair to obtain a digital signature of the application program, where the key pair is the manufacturer key pair corresponding to the application program.

Specifically, the security engine obtains the private key in the key pair from the key-pair storage device, and signs the second digest according to the obtained private key to obtain the digital signature of the application program.

There may be various algorithms of signing the second digest according to the obtained private key, such as an RSA, an ElGamal, a Fiat-Shamir, or a Schnorr, and the embodiment of the present disclosure does not specifically limit the used signature algorithm.

S203: Store the digital signature of the application program.

The digital signature of the application program may be stored to a trusted non-volatile random access memory NVRAM inside the security central processing unit CPU. A region, in the trusted NVRAM, of storing the digital signature is only allowed to be read by the security engine rather than the processor, which ensures that the region, in the NVRAM, of storing the digital signature is not infected, so as to ensure credibility and reliability of the stored digital signature.

It should be noted that, when the network device downloads the application program for the first time and receives a download completion instruction, the network device may also calculate the digital signature of the application program according to a method similar to the method that includes S201 to S203, and store the digital signature in the trusted NVRAM. Each time the application program is updated, the network device signs data of the application program according to the private key in the key pair and based on the steps S201 to S203, to obtain a digital signature of the application program, and then replaces the stored digital signature in the trusted NVRAM with the currently calculated digital signature of the application program.

In addition, in the embodiment of the present disclosure, the digital signature of the application program is not stored to a TPM chip, but is stored to the trusted NVRAM inside the CPU. Therefore, a TPM chip does not need to be disposed in the network device, which reduces costs of application program integrity verification.

After the application program in the network device is updated and the digital signature of the application program is updated according to S201 to S203, the stored digital signature in the network device is obtained by means of signing based on data of the updated application program, rather than being obtained by means of signing based on original data of the application program, which ensures that the stored digital signature in the network device is the latest, so as to perform integrity verification on the application program according to S204 to S206.

S204: Perform eigenvalue calculation on data of the application program when the application program starts, to obtain a first digest of the application program.

Specifically, when the application program starts, the data of the application program in the memory is read into the SRAM inside the security CPU by the security CPU; the data in the SRAM is read by using the security engine inside the security CPU; and eigenvalue calculation is performed on the read data by using the security engine, to obtain the first digest of the application program.

S205: Decrypt the stored digital signature of the application program according to a public key in the key pair to obtain the second digest of the application program.

The digital signature of the application program may be stored to the trusted NVRAM inside the security CPU. Therefore, before the decrypting the stored digital signature of the application program by using the security engine according to a public key in the key pair to obtain the second digest of the application program, the method further includes: obtaining the stored digital signature in the trusted NVRAM by using the security engine inside the security CPU, so as to ensure that the stored digital signature in the trusted NVRAM is not infected.

An algorithm of decrypting the stored digital signature of the application according to the public key in the key pair is the same as the signature algorithm in S202, which is also not specifically limited in the embodiment of the present disclosure.

S206: Determine that integrity verification of the application program passes if the first digest and the second digest are the same, or determine that integrity verification of the application program does not pass if the first digest and the second digest are different.

Specifically, the security engine compares the first digest with the second digest. If the first digest and the second digest are the same, it is determined that the application program is not tampered with, and integrity verification of the application program passes. If the first digest and the second digest are different, it is determined that the application program is tampered with, and integrity verification of the application program does not pass. Further, when it is determined that the integrity verification of the application program does not pass, the network device may display prompt information to remind a user that the application program is tampered with, so that the user may no longer use the application program, Therefore, occurrence of security incidents, that is, stealing private information such as an account number and a password of the user, is prevented.

The calculated second digest in the foregoing S201 is obtained by means of calculation based on the data of the updated application program, that is, the second digest is a reference digest. If the application program is tampered with by a villain, the calculated first digest in the foregoing S204 is obtained by means of calculation based on data of an application program that has been tampered with. Therefore, integrity verification may be performed on the application program according to the first digest and the second digest.

In addition, the network device performs digital signature on the application program to entirely transfer an integrity protection mechanism of the application program to the network device side, and integrity of the application program no longer relies on privacy of a manufacturer private key. In this way, security decoupling is implemented between a manufacturer and a user, and the manufacturer and the user no longer rely on each other. Once a villain tampers with the application program and a security incident occurs, responsibilities of the security incident are relatively clear. Moreover, when patching or upgrading is performed on the application program in the network device and the network device is a large telecommunications device, a serious consequence is caused once a service is interrupted because the telecommunications device requires that the ongoing service cannot be interrupted. Therefore, according to the method provided in the embodiment of the present disclosure, patching or upgrading may be performed on the application program online, which avoids interrupting a service running in the telecommunications device.

In the embodiment of the present disclosure, each time an application program in a network device is updated, data of the application program is updated. In this case, the network device signs data of the application program according to a private key in an embedded key pair to obtain a digital signature of the application program. Eigenvalue calculation is performed on data of the application program when the application program starts, to obtain a first digest of the application program, and the digital signature of the application program is decrypted according to a public key in the key pair to obtain a second digest of the application program. It is determined that integrity verification of the application program passes if the first digest and the second digest are the same, or it is determined that integrity verification of the application program does not pass if the first digest and the second digest are different. The manufacturer key pair is embedded in the network device, and the data of the application program is signed according to the private key in the key pair each time the network device updates the application program, so that the digital signature of the application program is updated, and consequently, the second digest is also updated, which ensures that integrity verification of the application program can be performed after the application program is updated.

Figure 4:
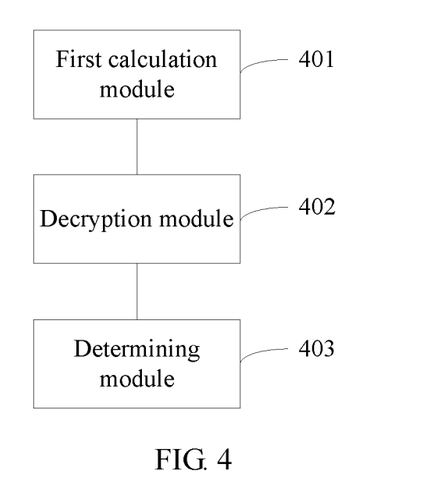
FIG. 4 is a schematic structural diagram of a network device according to an embodiment of the present disclosure.

FIG. 4 is a schematic structural diagram of a network device according to an embodiment of the present disclosure. A manufacturer key pair corresponding to an application program is stored in a trusted location of the network device. Referring to FIG. 4, the network device includes: a first calculation module 401, a decryption module 402 and a determining module 403.

The first calculation module 401 is configured to perform eigenvalue calculation on data of an application program when the application program starts, to obtain a first digest of the application program.

The decryption module 402 is configured to decrypt a stored digital signature of the application program according to a public key in an embedded key pair to obtain a second digest of the application program, where the digital signature is obtained, according to a private key in the key pair, by signing data of the application program each time the application program is updated, and the key pair is the manufacturer key pair corresponding to the application program.

The determining module 403 is configured to: determine that integrity verification of the application program passes if the first digest and the second digest are the same, or determine that integrity verification of the application program does not pass if the first digest and the second digest are different.

Optionally, the network device further includes:

a second calculation module, configured to perform eigenvalue calculation on the data of the application program when receiving an update completion instruction, to obtain the second digest of the application program;

a signature module, configured to sign the second digest according to the private key in the key pair to obtain the digital signature of the application program; and a storage module, configured to store the digital signature of the application program.

Optionally, the second calculation module includes:

a read-in unit, configured to read the data of the application program in a memory into a static random access memory SRAM inside a security central processing unit CPU;

a reading unit, configured to read the data in the SRAM by using a security engine inside the security CPU; and a calculation unit, configured to perform eigenvalue calculation on the read data by using the security engine, to obtain the second digest of the application program.

Optionally, the storage module includes:

a storage unit, configured to store the digital signature of the application program to a trusted non-volatile random access memory NVRAM inside the security CPU.

Optionally, the network device further includes:

an obtaining module, configured to obtain the stored digital signature in the trusted NVRAM by using the security engine inside the security CPU.

Optionally, when the eigenvalue calculation is hash calculation, an algorithm of the hash calculation may be a secure hash algorithm (SHA), an SHA2 algorithm, an SM3 cryptographic hash algorithm of Chinese commercial cryptographic hash algorithm standard published by State Cryptography Administration, or the like, which is not specifically limited in the embodiment of the present disclosure.

In the embodiment of the present disclosure, each time an application program in a network device is updated, data of the application program is updated. In this case, the network device signs data of the application program according to a private key in an embedded key pair to obtain a digital signature of the application program. Eigenvalue calculation is performed on data of the application program when the application program starts, to obtain a first digest of the application program, and the digital signature of the application program is decrypted according to a public key in the key pair to obtain a second digest of the application program. It is determined that integrity verification of the application program passes if the first digest and the second digest are the same, or it is determined that integrity verification of the application program does not pass if the first digest and the second digest are different. The manufacturer key pair is embedded in the network device, and the data of the application program is signed according to the private key in the key pair each time the network device updates the application program, so that the digital signature of the application program is updated, and consequently, the second digest is also updated, which ensures that integrity verification of the application program can be performed after the application program is updated.

It should be noted that, the division of the foregoing functional modules is used merely as an example for describing application program integrity verification performed by the network device provided in the foregoing embodiment. In actual application, the foregoing functions may be allocated to different functional modules as required for implementation, that is, the internal structure of the network device is divided into different functional modules to complete all or some of the foregoing functions. In addition, the network device provided in the foregoing embodiment belongs to the same concept as method embodiments of application program integrity verification. For a specific implementation process of the network device, reference may be made to the method embodiments, and details are not described herein again.

All foregoing optional technical solutions may form an optional embodiment of the present disclosure in any combination, and details are not described in the embodiment of the present disclosure again.

Figure 5:
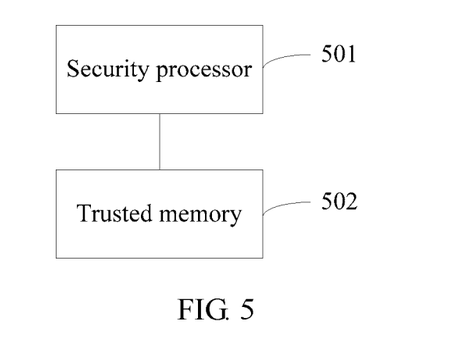
FIG. 5 is a schematic structural diagram of another network device according to an embodiment of the present disclosure.

FIG. 5 is a schematic structural diagram of another network device according to an embodiment of the present disclosure. Referring to FIG. 5, the network device includes: a security processor 501 and a trusted memory 502.

The security processor 501 is configured to: perform eigenvalue calculation on data of an application program when the application program starts, to obtain a first digest of the application program; decrypt a stored digital signature of the application program according to a public key in an embedded key pair to obtain a second digest of the application program, where the digital signature is obtained, according to a private key in the key pair, by signing data of the application program each time the application program is updated, and the key pair is a manufacturer key pair corresponding to the application program; determine that integrity verification of the application program passes if the first digest and the second digest are the same, or determine that integrity verification of the application program does not pass if the first digest and the second digest are different.

Optionally, the security processor 501 is further configured to: perform eigenvalue calculation on the data of the application program when receiving an update completion instruction, to obtain the second digest of the application program; sign the second digest according to the private key in the key pair to obtain the digital signature of the application program.

The trusted memory 502 is configured to store the digital signature of the application program.

Optionally, the security processor 501 is further configured to: read the data of the application program in a memory into a static random access memory SRAM inside a security central processing unit CPU; read the data in the SRAM; and perform eigenvalue calculation on the read data to obtain the second digest of the application program.

Optionally, the security central processing unit CPU may be located in the security processor 501.

Optionally, the security central processing unit CPU may be disposed separately with the security processor 501.

Optionally, the security processor 501 is further configured to store the digital signature of the application program to a trusted non-volatile random access memory NVRAM inside the security CPU.

Optionally, the security processor 501 is further configured to obtain the stored digital signature in the trusted NVRAM.

Optionally, when the eigenvalue calculation is hash calculation, an algorithm of the hash calculation may be a secure hash algorithm (SHA), an SHA2 algorithm, an SM3 cryptographic hash algorithm of Chinese commercial cryptographic hash algorithm standard published by State Cryptography Administration, or the like, which is not specifically limited in the embodiment of the present disclosure.

All foregoing optional technical solutions may form an optional embodiment of the present disclosure in any combination, and details are not described in the embodiment of the present disclosure again.

In the embodiment of the present disclosure, each time an application program in a network device is updated, data of the application program is updated. In this case, the network device signs data of the application program according to a private key in an embedded key pair to obtain a digital signature of the application program. Eigenvalue calculation is performed on data of the application program when the application program starts, to obtain a first digest of the application program, and the digital signature of the application program is decrypted according to a public key in the key pair to obtain a second digest of the application program. It is determined that integrity verification of the application program passes if the first digest and the second digest are the same, or it is determined that integrity verification of the application program does not pass if the first digest and the second digest are different. The manufacturer key pair is embedded in the network device, and the data of the application program is signed according to the private key in the key pair each time the network device updates the application program, so that the digital signature of the application program is updated, and consequently, the second digest is also updated, which ensures that integrity verification of the application program can be performed after the application program is updated.

A person of ordinary skill in the art may understand that all or some of the steps in the foregoing embodiments may be implemented by hardware, or by a program instructing related hardware. The program may be stored in a computer readable storage medium, and the foregoing storage medium may be a read-only memory, a magnetic disk, an optical disc, or the like.

The foregoing is only exemplary embodiments of the present disclosure, which is not intended to limit the present disclosure. Any modification, equivalent replacement and improvement made without departing from the spirit and principal of the present disclosure shall fall within the protection scope of the present disclosure.

What is claimed is:

1. An application program integrity verification method, executed by a network device, comprising:
   when obtaining a program package of an application program, storing a digital signature of the application program in the program package, wherein the program package includes the digital signature and data of the application program, wherein the digital signature is obtained, by a manufacturer, by signing a first digest of the application program using a private key of the manufacturer, wherein the first digest is obtained, by the manufacturer, by performing an eigenvalue calculation on the data of the application program;
   performing the eigenvalue calculation on the data of the application program when the application program starts, to obtain a second digest of the application program;
   decrypting the stored digital signature using a public key in an embedded key pair, to obtain the first digest of the application program, wherein the key pair is a manufacturer key pair corresponding to the application program;
   determining that an integrity verification of the application program passes if the first digest and the second digest are the same, or determining that integrity verification of the application program does not pass if the first digest and the second digest are different;
   updating the application program, and when receiving an update completion instruction, performing the eigenvalue calculation on updated data of the application program to obtain a third digest of the application program, signing the third digest according to a private key in the key pair to obtain a new digital signature of the application program, and storing the new digital signature of the application program;
   performing the eigenvalue calculation on data of the application program when the application program starts, to obtain a fourth digest of the application program;
   decrypting the stored new digital signature of the application program according to the public key to obtain the third digest of the application program; and
   determining that the integrity verification of the application program passes if the fourth digest and the third digest are the same, or determining that the integrity verification of the application program does not pass if the fourth digest and the third digest are different.

2. The method according to claim 1, wherein the performing the eigenvalue calculation on the updated data of the application program to obtain the third digest of the application program comprises:
   reading the updated data of the application program in a memory into a static random access memory (SRAM) inside a security central processing unit (CPU);
   reading the data in the SRAM by using a security engine inside the security CPU; and
   performing the eigenvalue calculation on the read data by using the security engine, to obtain the third digest of the application program.

3. The method according to claim 2, wherein the storing the new digital signature of the application program comprises:
   storing the new digital signature of the application program to a trusted non-volatile random access memory (NVRAM) inside the security CPU.

4. The method according to claim 3, wherein before the decrypting the stored new digital signature of the application program according to the public key to obtain the third digest of the application program, the method further comprises:
   obtaining the stored new digital signature in the trusted NVRAM by using the security engine inside the security CPU.

5. A network device, comprising:
   a memory storing computer executable program codes; and
   a processor, coupled with the memory;
   wherein the program codes comprise instructions that, when executed by the processor, cause the processor to:
   when obtaining a program package of an application program, store a digital signature of the application program in the program package, wherein the program package includes the digital signature and data of the application program, wherein the digital signature is obtained, by a manufacturer, by signing a first digest of the application program using a private key of the manufacturer, wherein the first digest is obtained, by the manufacturer, by performing an eigenvalue calculation on the data of the application program;
   perform the eigenvalue calculation on the data of the application program when the application program starts, to obtain a second digest of the application program; decrypt the stored digital signature using a public key in an embedded key pair, to obtain the first digest of the application program, wherein the key pair is a manufacturer key pair corresponding to the application program;
   determine that an integrity verification of the application program passes if the first digest and the second digest are the same, or determine that integrity verification of the application program does not pass if the first digest and the second digest are different;

update the application program, and when receiving an update completion instruction, perform the eigenvalue calculation on updated data of the application program to obtain a third digest of the application program, sign the third digest according to a private key in the key pair to obtain a new digital signature of the application program, and store the new digital signature of the application program;

perform eigenvalue calculation on data of the application program when the application program starts, to obtain a fourth digest of the application program; decrypt the stored new digital signature of the application program according to the public key to obtain the third digest of the application program; and determine that the integrity verification of the application program passes if the fourth digest and the third digest are the same, or determine that the integrity verification of the application program does not pass if the fourth digest and the third digest are different.

6. The network device according to claim 5, wherein the program codes further comprise instructions that, when executed by the processor, cause the processor to:

read the updated data of the application program in the memory into a static random access memory (SRAM) inside a security central processing unit (CPU);

read the updated data in the SRAM; and perform the eigenvalue calculation on the read data to obtain the third digest of the application program.

7. The network device according to claim 6, wherein the program codes further comprise instructions that, when executed by the processor, cause the processor to store the new digital signature of the application program to a trusted non-volatile random access memory (NVRAM) inside the security CPU.

8. The network device according to claim 7, wherein the program codes further comprise instructions that, when executed by the processor, cause the processor to obtain the stored new digital signature in the trusted NVRAM.

9. A non-transitory storage medium comprising instructions that, when executed by a computer, cause the computer to carry out steps comprising:

when obtaining a program package of an application program, storing a digital signature of the application program in the program package, wherein the program package includes the digital signature and data of the application program, wherein the digital signature is obtained, by a manufacturer, by signing a first digest of the application program using a private key of the manufacturer, wherein the first digest is obtained, by the manufacturer, by performing an eigenvalue calculation on the data of the application program;

performing the eigenvalue calculation on the data of the application program when the application program starts, to obtain a second digest of the application program;

decrypting the stored digital signature using a public key in an embedded key pair, to obtain the first digest of the application program, wherein the key pair is a manufacturer key pair corresponding to the application program;

determining that integrity verification of the application program passes if the first digest and the second digest are the same, or determining that integrity verification of the application program does not pass if the first digest and the second digest are different;

updating the application program, and when receiving an update completion instruction, performing the eigenvalue calculation on updated data of the application program to obtain a third digest of the application program, signing the third digest according to a private key in the key pair to obtain a new digital signature of the application program, and storing the new digital signature of the application program;

performing the eigenvalue calculation on data of the application program when the application program starts, to obtain a fourth digest of the application program;

decrypting the stored new digital signature of the application program according to the public key to obtain the third digest of the application program; and determining that an integrity verification of the application program passes if the fourth digest and the third digest are the same, or determining that the integrity verification of the application program does not pass if the fourth digest and the third digest are different.

10. The non-transitory storage medium according to claim 9, wherein the performing the eigenvalue calculation on the updated data of the application program to obtain the third digest of the application program comprises:

reading the updated data of the application program in a memory into a static random access memory (SRAM) inside a security central processing unit (CPU);

reading the data in the SRAM by using a security engine inside the security CPU; and performing the eigenvalue calculation on the read data by using the security engine, to obtain the third digest of the application program.

11. The non-transitory storage medium according to claim 10, wherein the storing the new digital signature of the application program comprises:

storing the new digital signature of the application program to a trusted non-volatile random access memory (NVRAM) inside the security CPU.

12. The non-transitory storage medium according to claim 11, further comprising instructions that, when executed by the computer, further cause the computer to carry out a step comprising: before the decrypting the stored new digital signature of the application program according to the public key to obtain the third digest of the application program, obtaining the stored new digital signature in the trusted NVRAM by using the security engine inside the security CPU.

* * * * *